3,703,484
POLYURETHANE FOAM PROCESS USING DI-STANNOXANE/AMINOALCOHOL CATALYST COMBINATION
Akizo Keshi, Takatsuki, Kunio Yoshii, Osaka, Makoto Yokoo, Toyonaka, and Kaichi Nakai, Itami, Japan, assignors to Takeda Chemical Industries, Ltd., Osaka, Japan
No Drawing. Continuation of abandoned application Ser. No. 656,340, July 27, 1967. This application Dec. 2, 1970, Ser. No. 94,562
Claims priority, application Japan, July 29, 1966, 41/49,930; Sept. 10, 1966, 41/60,050
Int. Cl. C08g 22/38, 22/42, 22/46
U.S. Cl. 260—2.5 AC    5 Claims

ABSTRACT OF THE DISCLOSURE

Non-yellowing flexible polyurethane foam is prepared by reacting dimethylbenzene $\omega,\omega'$-diisocyanate and polyol in the presence of a blowing agent, monoamino alcohol having 1 to 4 carbon atoms and octaalkyl-stannoxane catalyst.

---

This is a continuation application of Ser. No. 656,340, filed July 27, 1967, now abandoned.

This invention relates to a process for the production of flexible polyurethane foam by using dimethylbenzene $\omega,\omega'$-diisocyanate as an isocyanato component in the presence of octaalkyl-stannoxane and monoamino alcohol.

Polyurethane foam has heretofore been produced from aromatic isocyanate (e.g. tolylene diisocyanate, diphenylmethane diisocyanate, etc.) and polyether polyol or polyester polyol. However, thus-produced foam is greatly yellowed soon after its exposure to atmosphere, so that its application to practical use is considerably limited.

On the other hand, polyurethane resins produced by using aliphatic diisocyanate (e.g. hexamethylene diisocyanate, etc.) as an isocyanato component, is not so yellowed as that derived from aromatic isocyanate, but the former is much inferior to the latter with respect to physical properties.

Furthermore, it is substantially impossible to realize practical production of polyurethane foam by the use of aliphatic diisocyanate because of the remarkably low reactivity of the latter with polyol.

Thus, it has been a desideratum in the art to provide an industrially applicable process for the production of non-yellowing flexible polyurethane foam having good physical properties.

The object of the present invention is accordingly to provide non-yellowing flexible polyurethane foam having good physical properties. A further object of the present invention is to provide an industrially applicable process for the production of non-yellowing polyurethane foam having good physical properties.

These objects are readily achieved by the use of dimethylbenzene $\omega,\omega'$-diisocyanate as isocyanato component and octaalkyl-stannoxane as catalyst, the resultant readily-produced polyurethane foam having good physical properties and remaining un-yellowed even after exposure to atmosphere for a considerably long period of time. However, thus-prepared foam is frequently impaired by the appearance of cracks therein.

According to a further aspect of the present invention, the coexistence of a certain monoamino alcohol in the course of producing polyurethane foam by the above mentioned method can effectively inhibit occurrence of cracks in the foam.

Furthermore, the present invention makes it possible to use lactone-polyester polyol as polyol component in a so-called one-shot process for producing polyurethane foam, although lactone-polyester polyol has not heretofore been usable, in a one-shot process, for the production of polyurethane foam.

The aforesaid objects are realized by allowing dimethylbenzene $\omega,\omega'$-diisocyanate to react with an isocyanate-modified polyether polyol or polyester polyol in the presence of a blowing agent, monoamino alcohol having 1 to 4 carbon atoms, and octaalkylstannoxane.

As isocyanato component, dimethylbenzene $\omega,\omega'$-diisocyanate, which is represented by the formula

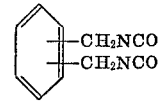

encompasses 1,2-dimethylbenzene $\omega,\omega'$-diisocyanate, 1,3-dimethylbenzene $\omega,\omega'$-diisocyanate, 1,4-dimethylbenzene $\omega,\omega'$-diisocyanate and mixtures thereof. From the practical point of view, a mixture of the 1,3-isomer and the 1,4-isomer, especially a mixture of 60 to 90 weight percent of the 1,3-isomer and 40 to 10 weight percent of the 1,4-isomer, is advantageously employed.

Polyol employable in the present invention is a member selected from the group consisting of isocyanate-modified polyether polyol and polyester polyol, each having two or more terminal hydroxyl groups and having a hydroxyl number of about 25 to about 75, preferably about 30 to about 65.

The above-mentioned isocyanate-modified polyether polyols may be those obtained by reacting an excess amount of polyether polyol, enumerated infra, with low molecular polyisocyanate such as tolylene diisocyanate, diphenyl-methane diisocyanate or dimethylbenzene $\omega,\omega'$-diisocyanate under heating in the presence of catalyst for urethane linkage formation.

As polyether polyol employable in producing the isocyanate-modified polyether polyol, there may be employed, e.g. a product obtained by addition polymerization of alkylene oxides (e.g. ethylene oxide, propylene oxide, butylene oxide, styrene oxide and mixtures thereof) to low molecular polyhydric alcohols employed as initiator (e.g. ethylene glycol, diethylene glycol, propylene glycol, glycerol, trimethylol propane, hexanetriol, pentaerythritol, sorbitol, sucrose, mannitol, sorbide, mannitan, sorbitan, and mixtures thereof) or to amines (e.g. ethylene diamine, propylenediamine, ethanolamine and mixtures thereof) under alkaline or acid conditions.

These polyether polyols can be prepared in per se known manner as described in "High Polymer, vol. XIII. Polyethers Part 1" (1963) by Norman G. Gaylord, published by Interscience Publishers.

Among the isocyanate-modified polyether polyols, the most desirable one is polyether polyol modified by dimethylbenzene $\omega,\omega'$-diisocyanate, which is prepared by reacting under heating the above-mentioned polyether polyol in excess with dimethylbenzene $\omega,\omega'$-diisocyanate in the presence of the octaalkyl-stannoxane of Formula II, infra.

Polyester polyols employable in this invention include products obtained by the reaction of low molecular polyhydric alcohol (e.g. ethylene glycol, propylene glycol, diethylene glycol, triethylene glycol, butylene glycol, trimethylol propane, glycerol, hexane-triol, pentaerythritol, and a mixture thereof) with polycarboxylic acids (e.g. succinic acid, glutaric acid, pimelic acid, suberic acid, azelaic acid, sebacic acid, maleic acid, fumaric acid, itaconic acid, phthalic acid, iso-phthalic acid, terephthalic acid, their acid anhydrides and a mixture thereof), and also polylactone polyester polyols obtained by reacting a lactone with a polyfunctional initiator by heating in the presence or absence of a catalyst, the initiator being exemplified by diols (e.g. ethylene glycol, propylene glycol, diethylene glycol, 1,4-butanediol, xylenediol, etc.), diamines (e.g. ethylenediamine, phenylenediamine xylylenediamine, etc.), amino alcohols (e.g. ethanolamine, p-aminophenethyl alcohol, etc.), polyols (e.g. glycerol, trimethylol propane, pentaerythritol, sorbitol, sucrose, mannitol, sorbide, oxyalkylene polyol, etc.) or polyamines (e.g. diethanolamine, diisopropanolamine, etc.).

The lactones employable are represented by, for example the formula:

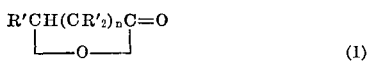

(1)

wherein $n$ is an integer not less than 3, at least $n+2$ R's are hydrogen, the remainder of the R's are alkyl, cycloalkyl, alkoxy or single ring aromatic hydrocarbon radicals, none of the substituents containing more than about twelve carbon atoms, and the total number of carbon atoms in the substituents on the lactone ring not exceeding twelve. As typical lactones, there are exemplified δ-valerolactone, ε-caprolactone, ξ-enantholactone, η-caprilolactone, β-ethyl-δ-valerolactone or dimethyl caprolactone.

The polyester polyol may be prepared in per se known manner as described in, for example, "Polyesters and Their Application," third edition, April 1959, published by Bjorksten Research Lab., Inc., New York, U.S.A. and in U.S. Pats. No. 2,890,208, No. 2,977,885 and No. 2,933,478.

In the present invention, the octaalkyl-stannoxane (II) is used as a catalyst:

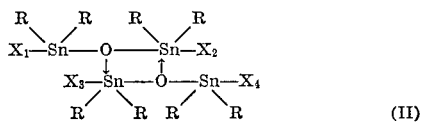

(II)

In this formula, each of $X_1$, $X_2$, $X_3$ and $X_4$ stands for halogen (Cl, Br, I, F), OH, alkoxy, formyloxy, alkylcarbonyloxy, NCO or NCS, and each R stands for alkyl, "alkyl" and "alkoxy" containing not more than 4 carbon atoms, and "alkylcarbonyloxy" containing 2 to 17 carbon atoms, inclusive.

This compound has heretofore been regarded as tetraalkyl-distannoxane of the formula

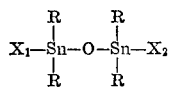

but it has been confirmed that the compound exists under usual conditions in the form of dimer, namely the octaalkyl-stannoxane of Formula II. Therefore, in the present specification, the compound is described and referred to as the dimer, the octaalkyl-stannoxane of Formula II.

The stannoxane of Formula II can be prepared, for example, by the procedure described in "Journal of Organo-Metallic Chemistry," volume 1, No. 1, pages 81–88 (1963).

In the present invention, the most typical and desirable octaalkyl-stannoxanes for practical use are exemplified as follows:

(1) Octamethyl-tetrachloro-stannoxane
(2) Octabutyl-tetrachloro-stannoxane
(3) Octabutyl-tetrabromo-stannoxane
(4) Octabutyl-dichloro-dihydroxy-stannoxane
(5) Octabutyl-tetraacetoxy-stannoxane
(6) Octaethyl-tetraformyloxy-stannoxane
(7) Octabutyl-diacetoxy-dihydroxy-stannoxane
(8) Octabutyl-tetralauroyloxy-stannoxane
(9) Octapropyl-tetrastearoyloxy-stannoxane
(10) Octabutyl-tetraisocyanato-stannoxane
(11) Octaethyl-diisocyanato-dihydroxy-stannoxane
(12) Octamethyl-diisocyanato-dimethoxy-stannoxane
(13) Octabutyl-tetraisothiocyanato-stannoxane
(14) Octabutyl-diisothiocyanato-diethoxy-stannoxane
(15) Octamethyl-dichloro-dimethoxy-stannoxane
(16) Octaethyl-dibromo-diethoxy-stannoxane
(17) Octabutyl-diacetoxy-diethoxy-stannoxane According to the present invention, a suitable amount of monoamino alcohol having 1 to 4 carbon atoms is present in the reaction system, whereby the polyurethane foam produced is free from cracking.

As the monoamino alcohol, there may be employed, for example, 2-aminoethanol, 2-aminopropan-1-ol, 1-aminopropane-2-ol, 2-aminobutan-1-ol, 1-aminopropan-3-ol, 3-aminobutan-1-ol, among which 2-aminoethanol is most advantageous from the viewpoint of practical use.

As the blowing agent, there may be employed those per se known, for example, water, compounds producing water during the reaction, halogenated hydrocarbons having a relatively low boiling point such as dichlorodifluoromethane, trichloromonofluoromethane, or compounds generating nitrogen gas during the reaction such as azo compounds.

The amount of the compound of Formula II used as a catalyst in this invention is about 0.05 to about 2.0, preferably about 0.1 to about 1.5, weight parts per 100 weight parts of the polyol component.

The amount of the monoamino alcohol used in this invention varies with the polyol employed and with reaction conditions, but it generally falls in the range from about 0.1 to about 5, especially from about 0.3 to about 3.0, weight parts per 100 weight parts of the polyol component.

In carrying out the method of this invention, the sole use of the compound (II) as catalyst yields polyurethane foam with desirable properties, but tertiary amines may be employed together with the compound of the Formula II.

As the tertiary amine, use may be made, for example, of triethylamine, N,N,N',N'-tetramethyl-1,3-butanediamine, etc.

In the method of this invention, the reaction can be carried out in the presence of, for example, foam stabilizer (e.g. silicone oil-poly-dimethyl siloxane, alkylsilane-polyoxyalkylene copolymer), non-ionic surface active agents (e.g. sorbitan monostearate, glycerol mono-oleate, castor oil-ethylene oxide adduct, etc.), paints, additives, reinforcing materials, dyes, antioxidants, fireproofing agents, etc.

The precise procedures for the production of the polyurethane foam in this invention are those similar to per se known procedures as described, for example, in "High Polymers, vol. XVI Polyurethanes: Chemistry and Technology I, Chemistry" by Saunders and Frisch (1962), published by Interscience Publishers.

For the purpose of a better undertsanding of this invention, the following examples are given. However, it is to be understood that this invention is not limited to those examples.

In these examples, "parts" means parts by weight unless otherwise specified.

Parts by weight bear the same relation to parts by volume as do grams to milliliters.

Throughout the specification, the abbreviations kg., g., m., cps., and cm. represent kilograms, grams, meters, centipoises and centimeters, respectively.

EXAMPLE 1

To 100 parts by polycaprolactone polyester polyol (OH number 55.5, acid number 0.6, white wax-like substance), which is obtained by reacting epsilon-caprolactone with trimethylol propane after the manner disclosed in U.S. Pat. No. 2,890,208, is added, under vigorous stirring and heating at 45° C., 2.0 parts of castor oil-ethylene oxide adduct obtained by reacting ethylene oxide with castor oil (commercially available under the trade name "Newpole CZ 300"), 0.5 part of 2,5-di-tert.-amyl-hydroquinone, 3.0 parts of water, 1.5 parts of 2-aminoethanol and 0.16 part of octabutyl-tetralauroyloxystannoxane in this order.

This mixture is then admixed with 46.5 parts of dimethylbenzene ω,ω'-diisocyanate (a mixture of 75 parts of 1,3-isomer and 25 parts of 1,4-isomer) under vigorous stirring, whereupon a reaction takes place to yield white flexible polyurethane foam.

CONTROL 1

The same procedure as Example 1 is carried out without using 2-amino-ethanol, using triethylene diamine (0.3 part) and stannous-2-ethylhexoate (0.7 part) in place of octabutyl-tetra-lauroyloxy stannoxane (0.16 part) and using 42 parts of dimethylbenzene ω,ω'-diisocyanate. However, during the foaming reaction, once-produced foam is then completely collapsed so that no foam product is obtained.

EXAMPLE 2

To 100 parts of polycaprolactone polyester polyol having the same properties as the one used in Example 1 is added, under vigorous stirring and heating at 45° C., 2.0 parts of "Newpole CZ 300," 0.5 part of 2,5-di-tert.-amylhydroquinone, 2.0 parts of water, 0.5 part of 2-aminoethanol and 0.2 part of octabutyl-tetraacetoxy-stannoxane in this order.

The mixture is then admixed with 33.5 parts of dimethylbenzene ω,ω'-diisocyanate (a mixture of 70 parts of 1,3-isomer and 30 parts of 1,4-isomer) under vigorous stirring, whereupon a reaction takes place to yield white flexible polyurethane foam.

CONTROL 2

The same procedure as Example 2 is carried out without using 2-aminoethanol.

Polyurethane foam thus produced has large cracks therein.

EXAMPLE 3

To 100 parts of polycaprolactone polyester polyol (OH number 55.5, acid number 0.6, white wax-like substance), which is obtained by reacting epsilon-caprolactone and glycerol after the manner disclosed in U.S. Pat. No. 2,890,208, is added, under vigorous stirring and heating at 45° C., 2.0 parts of "Newpole CZ 300," 0.5 part of 2,5 - di - tert.-amylhydroquinone, 2.5 parts of water, 1.2 parts of 2-aminoethanol and 0.15 part of octabutyl-dichloro-dihydroxy-stannoxane in this order. The mixture is then admixed with 41.0 parts of dimethylbenzene ω,ω'-diisocyanate (a mixture of 78 parts of 1,3-isomer and 22 parts of 1,4-isomer) under vigorous stirring, whereupon a reaction takes place to yield white flexible polyurethane foam.

EXAMPLE 4

To 100 parts of polycaprolactrone polyester polyol (OH number 56.0, acid number 0.47, white wax-like substance), which is obtained by reacting epsilon-caprolactone and polyether polyol (product from glycerol and propylene oxide, OH number 160) after the manner disclosed in U.S. Pat. No. 2,890,208, is added under vigorous stirring and heating at 45° C., 2.0 parts "Newpole CZ 300," 0.5 part of 2,5-di-tert.-amylhydroquinone, 2.5 parts of water, 1.4 parts of 2-aminoethanol and 0.17 part of octabutyl-tetraacetoxy-stannoxane in this order.

The mixture is then admixed with 42.0 parts of dimethylbenzene ω,ω'-diisocyanate (a mixture of 78 parts of 1,3-isomer and 22 parts of 1,4-isomer) under vigorous stirring, whereupon a reaction takes place to yield white flexible polyurethane foam.

EXAMPLE 5

100 parts of polyester polyol [OH number 61, acid number 0.9, water content 0.02%, viscosity 1000 cps. (75° C.)], which is obtained by reacting adipic acid, diethylene glycol and trimethylol propane, is mixed homogeneously with 3.0 parts of water, 2.0 parts of castor oil-ethylene oxide adduct obtained by reacting ethylene oxide with castor oil (commercially available under the trade name "Nikkol CO 40"), 0.5 part of 2,5-di-tert.-amylhydroquinone. After being heated at 50° C., the mixture is admixed under vigorous stirring with 0.1 part of octabutyl-tetraacetoxy-stannoxane, 0.6 part of 2-aminoethanol and then with dimethylbenzene ω,ω'-diisocyanate (a mixture of 75 parts of 1,3-isomer and 25 parts of 1,4-isomer), whereupon reaction takes place to yield white flexible polyurethane foam.

EXAMPLE 6

100 parts of polyester polyol having the same properties as the one used in Example 5 is homogeneously admixed with 2.5 parts of water, 2.0 parts of "Nikkol CO 40" and 0.5 part of 2,5-di-tert.-amylhydroquinone.

After being heated at 50° C., the mixture is admixed homogeneously with 0.12 part of octabutyl-tetralauroyloxy-stannoxane, 0.5 part of 2-aminoethanol and then with dimethylbenzene ω,ω'-diisocyanate (a mixture of 75 parts of 1,3-isomer and 25 parts of 1,4-isomer), whereupon a reaction takes place to yield white flexible polyurethane foam.

EXAMPLE 7

To 100 parts of polycaprolactone polyester polyol having the same properties as the one used in Example 3 is added, under vigorous stirring and heating at 45° C., 2.0 parts of "Newpole CZ 300," 0.5 part of 2,5-di-tert.-amylhydroquinone, 2.5 parts of water, 1.2 parts of 2-aminoethanol and 0.15 part of octabutyl-tetraisocyanato-stannoxane in this order. The mixture is then admixed with 41.0 parts of dimethylbenzene ω,ω'-diisocyanate (a mixture of 78 parts of 1,3-isomer and 22 parts of 1,4-isomer) under vigorous stirring, whereupon a reaction takes place to yield white flexible polyurethane foam.

EXAMPLE 8

To 100 parts of polycaprolactone polyester polyol having the same properties as the one used in Example 4 is added, under vigorous stirring and heating at 45° C., 2.0 parts of "Newpole CZ 300," 0.5 part of 2,5-di-tert.-amyl-hydroquinone, 2.5 parts of water, 1.4 parts of 2-aminoethanol and 0.17 part of octabutyl-diisothiocyanato-diethoxy-stannoxane in this order. The mixture is then admixed with 42.0 parts of dimethylbenzene ω,ω'-diisocyanate (a mixture of 78 parts of 1,3-isomer and 22 parts of 1,4-isomer), under vigorous stirring, whereupon a reaction takes place to yield white flexible polyurethane foam.

EXAMPLE 9

100 parts of polyester polyol having the same properties as the one used in Example 5 is homogeneously admixed with 3.0 parts of water, 2.0 parts of "Nikkol CO 40" and 0.5 part of 2,5-di-tert.-amylhydroquinone. After being heated at 45° C., the mixture is admixed homogeneously with 0.12 part of octapropyl-tetrabromo-stannoxane, 0.4 part of 2-aminoethanol, and then with dimethylbenzene ω,ω'-diisocyanate (a mixture of 78 parts of 1,3-isomer and 22 parts of 1,4-isomer), whereupon a reaction takes place to yield white flexible polyurethane foam.

EXAMPLE 10

To 100 parts of polycaprolactone polyester polyol having the same properties as the one used in Example 1 is added under vigorous stirring and heating at 45° C., 2.0 parts of "Newpole CZ 300," 0.5 part of 2,5-di-tert.-amyl-hydroquinone, 3.0 parts of water, 1.5 parts of 2-aminoethanol and 0.16 part of octabutyl-tetrachloro-stannoxane in this order.

The mixture is then admixed with 45.9 parts of dimethylbenzene ω,ω'-diisocyanate (a mixture of 75 parts of 1,3-isomer and 25 parts of 1,4-isomer) under vigorous stirring, whereupon a reaction takes place to yield white flexible polyurethane foam.

EXAMPLE 11

100 parts of polyether triol (OH number 56), which is produced by addition polymerization of propylene oxide to glycerol, is admixed with 3.3 parts of dimethylbenzene ω,ω'-diisocyanate (a mixture of 70 parts of 1,3-isomer and 30 parts of 1,4-isomer) and 0.02 part of octabutyl-tetralauroyloxy-stannoxane, followed by heating at 70° C. for about 1 hour to give isocyanate-modified polyether polyol which shows OH number 35 and viscosity 3500 cps. (25° C.).

100 parts of the above prepared polyether polyol heated at 42° C. is homogeneously admixed under vigorous stirring with 1.5 parts of silicone oil, 0.5 part of 2,5-di-tert.-amylhydroquinone, 1.0 part of polymeric phenol type antioxidant (commercially available under the trade name "Topanol C.A."[1]), 3.0 parts of water, 1.2 parts of 2-aminoethanol and 0.8 part of octabutyl-tetralauroyloxy-stannoxane.

Thus-prepared mixture is then admixed under vigorous stirring with 40.5 parts of dimethylbenzene ω,ω'-diisocyanate (a mixture of 70 parts of 1,3-isomer and 30 parts of 1,4-isomer), whereupon a reaction takes place to yield white flexible polyurethane foam.

The properties of polyurethane foams obtained in the foregoing examples and controls are measured, the results being shown in Table 1.

number of about 25 to about 75 and a polyester polyol having a hydroxyl number of about 25 to about 75 in the presence of:

(a) a compound of the formula:

$$\begin{array}{c} R \quad R \quad R \quad R \\ \diagdown / \quad \diagdown / \\ X_1 - Sn - O - Sn - X_2 \\ | \quad \quad | \\ X_3 - Sn - O - Sn - X_4 \\ / \diagdown \quad / \diagdown \\ R \quad R \quad R \quad R \end{array}$$

wherein each of $X_1$, $X_2$, $X_3$ and $X_4$ is a member selected from the group consisting of halogen, —OH, lower alkoxy having at most 4 carbon atoms, formyloxy, alkylcarbonyloxy having at most 17 carbon atoms, —NCO and —NCS, and R is lower alkyl having at most 4 carbon atoms in the ratio of about 0.05 to about 2.0 weight parts per 100 weight parts of the polyol component, and (b) monoamino alcohol having at most 4 carbon atoms in the ratio of about 0.1 to about 5 weight parts per 100 weight parts of the polyol component.

2. The improvement as claimed in claim 1, wherein the monoamino alcohol is 2-aminoethanol.

3. The improvement as claimed in claim 1, wherein monoamino alcohol is 3-aminobutan-1-ol.

4. The improvement as claimed in claim 1, wherein the isocyanate-modified polyether polyol is one modified by dimethylbenzene ω,ω'-diisocyanate.

5. The improvement as claimed in claim 1, wherein the polyester polyol is polycaprolactone polyester polyol.

TABLE 1.—THE MECHANICAL PROPERTIES OF POLYURETHANE FOAM

| | Example No. | | | | | | | | | | | Control No. | |
|---|---|---|---|---|---|---|---|---|---|---|---|---|---|
| | [a]1 | 2 | 3 | 4 | 5 | 6 | 7 | 8 | 9 | 10 | 11 | 1 | 2 |
| Density (kg./m.³) | 28.4 | 45.0 | 34.6 | 34.1 | 28.0 | 33.0 | 34.4 | 34.2 | 28.5 | 28.2 | 33.5 | (b) | (c d) |
| Tensile strength (kg./cm.²) | 1.18 | 1.40 | 1.17 | 1.15 | 1.0 | 1.05 | 1.16 | 1.15 | 1.05 | 1.20 | 0.85 | (b) | (c d) |
| Elongation, percent | 260 | 260 | 250 | 250 | 280 | 270 | 250 | 250 | 280 | 280 | 240 | (b) | (c d) |
| Tear strength (kg./m.) | 0.30 | 0.40 | 0.30 | 0.35 | 0.33 | 0.35 | 0.35 | 0.33 | 0.35 | 0.33 | 0.25 | (b) | (c d) |
| Compression set, percent | 14.8 | 3.7 | 4.8 | 4.0 | 10.0 | 12.5 | 4.8 | 4.2 | 10.0 | 10.0 | 7.5 | (b) | (c d) |
| Indentation load deflection (kg.) (JIS [e] K-6401 25% compress) | 9.2 | 15.8 | 11.3 | 10.6 | 10.8 | 13.2 | 10.0 | 9.6 | 10.5 | 9.5 | 9.1 | (b) | (c d) |
| Compression load, percent: | | | | | | | | | | | | | |
| 25 | 25.0 | 42.0 | 32.6 | 30.5 | 33.0 | 32.0 | 31.6 | 41.0 | 26.0 | 26.5 | 26.0 | (b) | (c d) |
| 50 | 30.4 | 60.2 | 46.8 | 41.2 | 40.0 | 39.8 | 45.4 | 58.8 | 31.5 | 32.1 | 32.0 | (b) | (c d) |
| 65 | 43.4 | 95.0 | 70.6 | 65.4 | 53.0 | 58.9 | 68.8 | 93.5 | 44.5 | 44.8 | 48.0 | (b) | (c d) |
| Flex fatigue loss of height, percent (ASTM [f] D-1564 after 30 min.) | 2.1 | 1.6 | 1.7 | 1.5 | 1.7 | 1.5 | 1.6 | 1.6 | 2.0 | 2.0 | 2.3 | (b) | (c d) |
| Chemical resistance: | | | | | | | | | | | | | |
| Against trichlorethylene | | | | | | Good | | | | | | (b) | (c d) |
| Against 1,1,1-trichlorethane | | | | | | Good | | | | | | (b) | (c d) |
| Heat resistance (120° C., 22 hours) | | | | | | Good | | | | | | (b) | (c d) |
| Weathering resistance (after exposure to atmosphere for 3 months) | | | | | | Non-yellowed | | | | | | (b) | (c d) |

[a] Substantially same result is obtained by using 1.0 part of 3-aminobutan-1-ol in place of 1.5 parts of 2-aminoethanol in the Example 1.
[b] Foam product is not produced.
[c] Cracking occurs.
[d] Measurement of properties is impossible because of remarkabl "cracking" occurring in foams.
[e] Japanese Industrial Standard.
[f] American Society for Testing Materials.

[1] "Topanol" C.A. is a 3 : 1 condensate of 3-methyl-6-t- butylphenol with crotonaldehyde and is essentially tris-(2-methyl-4-hydroxy-5-t-butylphenyl)butane.

What is claimed is:

1. In a process for the production of polyurethane foam from dimethylbenzene ω,ω'-diisocyanate and polyol in the presence of a blowing agent, the improvement which comprises allowing the diisocyanate to react with a member selected from the group consisting of an isocyanate-modified polyether polyol having a hydroxyl

References Cited

UNITED STATES PATENTS

| 3,186,971 | 6/1965 | Hostettler et al. | 260—77.5 |
| 3,222,387 | 12/1965 | Von Brachel et al. | 260—453 |
| 3,232,973 | 2/1966 | Bayer et al. | 260—453 |
| 3,194,773 | 7/1965 | Hostettler | 260—2.5 |
| 3,240,730 | 3/1966 | Hostettler | 260—2.5 |
| 3,341,482 | 9/1967 | Gmitter et al. | 260—2.5 |
| 3,061,557 | 10/1962 | Hostettler et al. | 260—2.5 |

(Other references on following page)

FOREIGN PATENTS

| | | | |
|---|---|---|---|
| 3,476,933 | 11/1969 | Mendelsohn | 260—2.5 |
| 248,966 | 2/1960 | Australia | 260—2.5 AL |
| 242,766 | 1/1963 | Australia | 260—2.5 |
| 974,170 | 11/1964 | Great Britain | 260—2.5 |
| 1,411,370 | 10/1965 | France | 260—2.5 |
| 672,598 | 10/1963 | Canada | 260—2.5 |

OTHER REFERENCES

Alleston et al.: Proceedings of the Chemical Society, December 1961, p. 457.

Okawara et al.: Jour. of Organometallic Chemistry, vol. 1 (1963), pp. 81–88.

Okawara et al.: Jour. Amer. Chem. Soc., vol. 82 (1960), pp. 3285–3287.

Chem. Abstracts, vol. 67, 1967, p. 101095, Agawa et al.: Shikizai Kyokaishi 38(11), pp. 465–471 (1965).

DONALD E. CZAJA, Primary Examiner

H. S. COCKERAM, Assistant Examiner

U.S. Cl. X.R.

260—2.5 AB, 2.5 AT, 2.5 AN